Dec. 14, 1954 B. T. SETCHELL Re. 23,909

SAFETY CONTROL CIRCUIT FOR ELECTRONIC AMPLIFIERS

Original Filed May 23, 1950

Inventor
Barton T. Setchell
By his Attorneys
Merchant & Merchant

United States Patent Office

Re. 23,909
Reissued Dec. 14, 1954

23,909

SAFETY CONTROL CIRCUIT FOR ELECTRONIC AMPLIFIERS

Barton T. Setchell, New Brighton, Minn.

Original No. 2,589,299, dated March 18, 1952, Serial No. 163,704, filed May 23, 1950. Application for reissue filed June 11, 1952, Serial No. 293,028

3 Claims. (Cl. 315—27)

Matter enclosed in heavy brackets [ ] appears in the original patent but forms no part of this reissue specification; matter printed in italics indicates the additions made by reissue.

My present invention relates to improved means or systems for automatically protecting the horizontal sweep sections of television instruments, such as conventional television receivers, against overloading and resultant damage to the components thereof in the event of drive signal voltage failure. In this portion of the conventional television instrument, the signal input grid of the horizontal output tube is driven by a normally continuous and predominantly negative signal input voltage or potential produced by a suitable signal generator such as a vacuum tube oscillator. Because the predominantly negative signal grid input voltage tends to reduce the power output of the horizontal output tube far below the normal operating capacity thereof and elements in or driven from the plate circuit thereof, some control means is desirable or necessary in order to cause the output tube to operate within the normal power output range thereof in the presence of said predominately negative signal grid input voltage. This, of course, can be done by applying a proper D. C. control potential to a control element of the output tube, such as a grid thereof. In practice, this control can be obtained by applying a positive D. C. potential to a screen grid of the horizontal output tube, or may be obtained by applying a [negative] *positive* potential to the signal control grid. In conventional television practice, the necessary control potential is usually applied as a positive potential to the screen grid of a tetrode output tube, and such control potential is conventionally obtained from a relatively fixed high voltage source, such as the high voltage D. C. power supply of the television instrument, and which is, of course, a source entirely independent of the horizontal output tube or elements driving the same or driven therefrom. Hence, it will be seen that in conventional television practice, loss, for any reason whatsoever, of the predominately negative signal grid input voltage to the horizontal output tube results in an immediate power increase in the plate circuit of said tube and consequent heavy overloading of the output tube and elements in or driven from the plate circuit thereof. This jeopardizing of the output tube and elements in or driven from the plate circuit thereof, as a result of loss of signal input grid voltage, has represented a serious problem in the television industry, wherein it has been customary to provide a measure of protection to the horizontal output tube and component circuit elements by placing a fuse in the plate circuit of the tube. However, this procedure does not offer reliable protection due to the following obvious facts, to wit:

A. Overloading for some duration of time must occur in order to burn out the fuse and open the plate circuit, and this occurrence for even a brief period is inevitably injurious to and is often fatal to one or more of the circuit elements, such as the output tube itself, the plate coupling transformer, resistors, and in some circuits, also, a damper tube.

B. While it may be possible in theory to provide satisfactory protection against overloading of the plate circuit of the output tube by choice of a fuse which will burn out instanteously responsive to only a very small abnormal power increase in the plate circuit of the tube, such perfect fuse selection is not possible in practical application due to normal line voltage fluctuations, manufacturing tolerances and other unavoidable variables.

Hence, in commercial practice, it has been necessary to employ fuses of sufficient power rating to provide reasonable assurance against fuse failure due to variables other than loss of the predominately negative signal grid input voltage. Of course, when this is done, the fuse many times does not burn out responsive to loss of signal grid input voltage in time to save the elements in or driven by the plate circuit of the power tube.

In view of the above, it is an object of the present invention to provide positive and unfailing assurance against overloading of the plate circuit of the horizontal sweep power output tube, or equivalent, as a result of loss of signal grid input voltage. In accordance with the invention, I accomplish this objective by controlling the power output of the output tube or other electronic amplifier from a *suitable* [D. C.] source of control potential that is dependent upon the presence of a signal grid input voltage to the signal input grid of the amplifier and fails responsive to loss of signal grid input voltage or potential. Generally stated, this source of [D. C.] control potential [is] *may be* the amplified signal potential or voltage present in the plate circuit of the output tube and which obviously is a product of and dependent upon the presence of a signal voltage in the input signal grid circuit of the tube or amplifier. Most conventional television instruments of the present day employ a coupling transformer for coupling the horizontal output tube to its load and, in applying the invention to instruments of this kind, I preferably control the power output of the horizontal output tube by utilizing A. C. induced in a secondary winding of the coupling transformer, rectifying this A. C. to provide a source of D. C. control potential, and applying this or part thereof to a control element of the output tube, such as a grid thereof, as a power output control. Since A. C. exists in the secondary of the coupling transformer only as a direct result of a signal voltage or potential in the input grid circuit of the horizontal output tube, it will follow that this chosen source of power control potential for the output tube will fail responsive to loss of signal voltage in the input grid circuit of the tube and will thereby prevent any abnormal increase in the power developed in the plate circuit of the output tube in the event of loss of signal voltage in the signal grid circuit.

The above and other important objects and advantages of the invention will be made apparent from the following specification, claims and appended drawings.

In the accompanying drawings, like characters indicate like parts throughout the several views.

Referring to the drawings.

DECRIPTION OF FIG. 1

Figure 1:
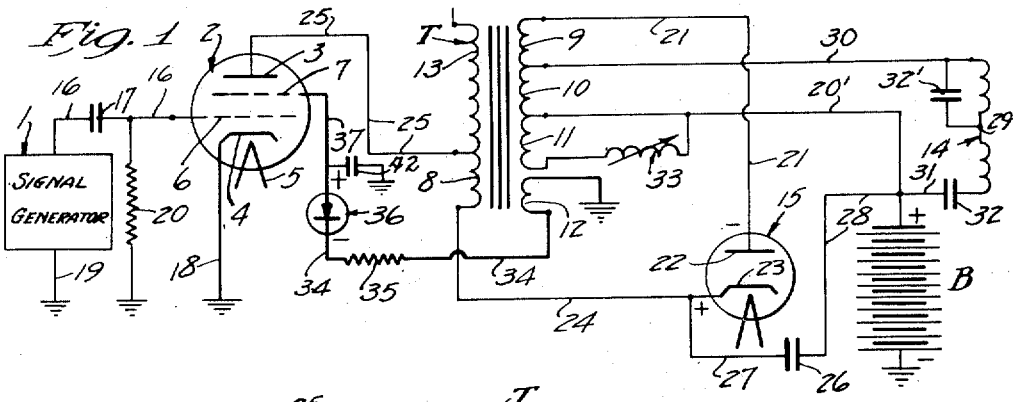
Fig. 1 is a schematic wiring diagram of the horizontal output section of a television instrument incorporating a preferred embodiment of the invention.

In Fig. 1, the numeral 1 indicates a signal generator which may be assumed to be of the type customarily employed in conventional television instruments to provide a source of predominately negative signal voltage for driving the signal grid of an of an electronic amplifier, in the nature of a horizontal output tube, indicated as an entirety by 2. The horizontal output tube 2 shown is of the tetrode variety comprising the usual plate 3, cathode 4, cathode heater 5, signal grid 6 and screen grid 7. For the purpose of example, this horizontal output tube 2 may be a commercially available 6B06G, or any other tube having the necessary or desired characteristics. The coupling transformer of Fig. 1 is indicated as an entirety by T and comprises a primary winding 8, a tapped secondary winding made up of sections 9, 10 and 11, another secondary winding indicated by 12, and a high voltage winding 13 formed as part of the primary winding 8, but actually serving as a secondary winding in the manner of an auto-transformer. Other conventional elements of Fig. 1 are a horizontal yoke coil 14, a source of high voltage D. C. indicated by B and which may be a B battery or the conventional high voltage supply of the television instrument, and a damper tube 15, which may be a commercially available 6W4 rectifier tube.

The signal grid 6 of the horizontal output tube 2 is driven from the signal generator 1 through *a circuit comprising* a lead 16 from the signal generator to the signal grid 6 and having interposed therein a condenser 17, the said signal grid 6, the cathode 4, a lead 18 from cathode to ground, and a lead 19 from ground back to the opposite side of the signal generator 1. As shown, a balancing resistor 20 is connected between the signal grid 6 and cathode 4.

The plate circuit of the horizontal output tube 2 comprises the high voltage D. C. source B, a lead 20′ from the positive side of said source to one end of section 10 of the multiple section transformer secondary winding, sections 10 and 9 of said multiple section secondary transformer winding, a lead 21, the plate 22 and cathode 23 of the damper tube 15, a lead 24, the primary winding 8 of the transformer T, a lead 25, the plate 3 and cathode 4 of the horizontal output tube 2, lead 18, and ground back to the negative side of source B. This circuit is conventional and in accordance with conventional practice, there is provided a condenser 26 connected by a lead 27 to the cathode 23 of damper tube 15 and by a lead 28 to the positive side of potential D. C. source B. It will be understood that the transformer secondary sections 9, 10 and 11 may be considered either as sections of a common secondary winding or as separate secondary serially-connected windings.

The horizontal yoke coil 14, which is center tapped at 29, is connected across the section 10 of the multiple section secondary winding of transformer T by a lead 30, a lead 31 having interposed therein a condenser 32 and lead [20] *20′*. Another condenser 32′ is connected across the upper section of yoke coil 14. A horizontal picture width control 33 is connected across section 11 of the multiple section secondary winding of transformer T. This horizontal picture width control 33 is in the nature of a variable inductance and is conventional as are all of elements 1 through 33 described above.

In the arrangement of Fig. 1, I control the power of the plate circuit of the horizontal output tube 2 by safety power control circuit comprising the secondary winding 12 of transformer T, a lead 34 having interposed therein a voltage reducing resistor 35, a rectifier 36, a lead 37, the screen grid 7 and cathode 4 of tube 2, and lead 18 and ground returning to the secondary winding 12. The rectifier 36 may be of any suitable variety, such, for example, as a selenium rectifier, or a vacuum tube rectifier, and has its positive D. C. output side connected to the screen grid 7 as a power control for the horizontal output tube. In the arrangement illustrated, the auto-transformer type of winding 13 of transformer T is usually and may be assumed to be utilized as a high voltage supply for the cathode-ray picture tube, not shown, of a television instrument. Preferably, and as illustrated, a tank-acting condenser 42 is connected between the positive output side of the rectifier 36 and ground. This condenser 42 corresponds to the condenser 42′ of Fig. 2 and performs the same function as does the condenser 42′ of Fig. 2.

OPERATION OF FIG. 1

Under normal operating conditions, there will, as previously indicated, be a substantially continuous and predominately negative signal voltage or potential impressed upon the signal grid 6 of the horizontal output tube 2. This predominately negative signal grid voltage maintains the signal grid 6 at sufficiently negative potential with respect to the cathode 4 to greatly reduce the current flowing in and the power consumed in the plate or primary output circuit comprising plate 3 and cathode 4, with respect to what would be the case in the absence of said predominately negative signal voltage. It will be understood, however, that the tube 2 is adjusted to operate at normal plate circuit current and power output by the safety power control circuit of the instant invention which comprises transformer secondary winding 12, lead 34, rectifier 36, lead 37, screen grid 7 and cathode 4. Hence, assuming that all the component elements in circuit of the system described are properly adjusted, the entire system will function normally so long as the signal generator continues to supply the normal predominately negative signal voltage or potential to the grid 6 of the horizontal output tube 2. Since all the circuits illustrated, except my safety power control circuit, are representative of conventional television practice, the normal operation of these conventional circuits will be self-apparent to those skilled in the art and will not be here reviewed.

The operation of the safety power control circuit of Fig. 1 is as follows: The predominately negative signal voltage developed by signal generator 1 and present in the signal grid input circuit comprising the signal grid 6 and cathode 4 is reflected in the primary plate output circuit of tube 2 comprising the source of potential B, lead 20′, secondary sections 10 and 9 of the secondary winding of the transformer T, lead 21, the damper tube 15, primary transformer winding 8, lead 25, and plate 3, and cathode 4 of tube 2, causing an A. C. signal voltage to be induced in secondary winding 12 of transformer T. The positive component of the signal voltage developed in secondary winding 12 of transformer T is impressed upon the screen grid 7 through lead 34, voltage regulating resistor 35, rectifier 36 and lead 37, as a positive D. C. control potential for tube 2. It will be understood that the current flowing in the plate circuit of the tube 2 and the resultant power developed therein is subject to control through the medium of the screen grid and increases responsive to application of increased positive D. C. potential to the screen grid. Preferably and as illustrated, a condenser 42′, which corresponds to the condenser 42 of Fig. 1, is interposed between ground and the lead 40 from the positive side of rectifier 36′; this condenser 42 functioning as a tank to smoothen out pulsations in the control potential applied to the horizontal output tube 2 by the safety control circuit. Of course it should be understood that the value of the positive D. C. potential impressed upon the screen grid 7 of tube 2 through my safety control circuit will be adjusted to obtain desired normal plate current and power values in the plate circuit of tube 2 in the presence of the predominately negative signal voltage in the signal grid circuit. Obviously then, if this screen grid control voltage or potential were to continue after failure or loss of input signal grid voltage, the plate current and power factors of the plate circuit of tube 2 would immediately rise to greatly increased values and would cause immediate overloading of tube 2 and all elements in the plate circuit thereof. However, when the power control potential is applied to tube 2 through the medium of the safety power control circuit of Fig. 1, loss of signal voltage or potential in the signal grid circuit of tube 2 results in an immediate and corresponding loss of control potential in the safety power control circuit comprising secondary winding 12, the rectifier 36, screen grid 7 and cathode 4 of tube 2, with the result that the plate circuit of tube 2 and its component elements are positively safeguarded against any possibility of overloading as a result of loss of signal voltage in the signal grid circuit of the tube 2.

DESCRIPTION AND OPERATION OF FIG. 2

Figure 2:
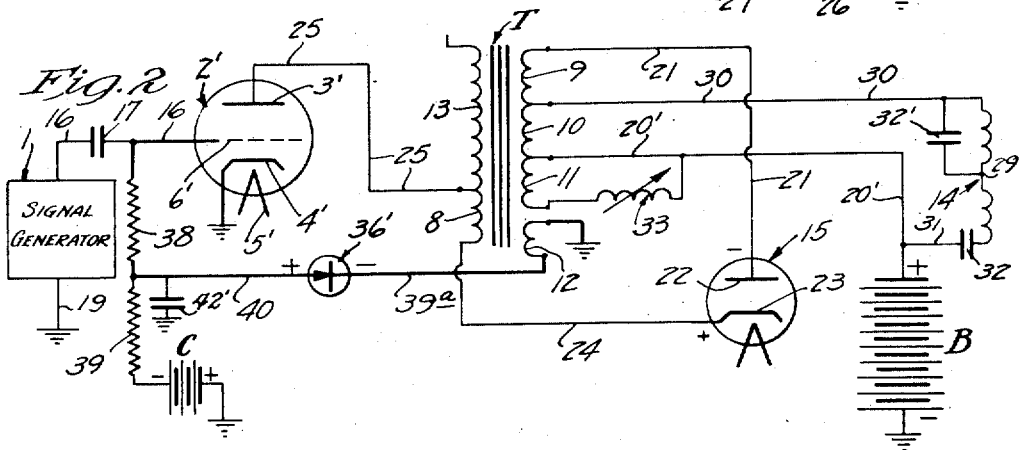
Fig. 2 is a schematic wiring diagram similar to Fig. 1 but illustrating another embodiment or form of the invention.

In Fig. 2, most of the conventional elements and circuits of the system are identical to Fig. 1 and are indicated by like characters. The object of the hook-up or arrangement of Fig. 2 is to illustrate an embodiment of the invention in a circuit utilizing a triode as a horizontal output tube, and which latter is devoid of the screen grid of the tetrode-type tube 2 of Fig. 1. In Fig. 2, the triode horizontal output tube is indicated as an entirety by 2′, the plate thereof by 3′, the cathode by 4′, cathode heater by 5′, and the signal grid by 6′. By further reference to Fig. 2, it will be noted that the grid is connected to ground through lead 16, a pair of balancing resistors 38 and 39, and a source of negative C-bias potential C, shown as a C battery, the positive side of which C battery is connected to the cathode 4′ through ground. The value of negative C-bias supplied to the cathode 4′ through the negative C-bias circuit just described, is adjusted to prevent overloading of the plate circuit of the horizontal output tube 2′ in the absence of a signal voltage applied to the signal grid 6′ of tube 2 through the medium of generator 1.

The safety power control circuit of Fig. 2 comprises the secondary winding 12 of transformer T, a lead 39a, a rectifier 36′, corresponding to that of Fig. 1, a lead 40 from the positive D. C. output side of rectifier 36′ to a point intermediate balancing resistors 38 and 39, balancing resistor 38, lead 16, signal grid 6', cathode 4' and ground back to one end of transformer secondary winding 12. When there is a signal voltage present in the signal grid circuit of tube 2', there will be a resultant alternating current signal voltage induced in the secondary transformer secondary winding 12, which will be rectified by the rectifier 36' and impressed upon the signal grid 6' of the tube 2' as a positive D. C. control potential or voltage. In practice, the value of this rectified D. C. control potential impressed upon the signal grid 6' will be sufficient to override or neutralize the negative C-bias applied thereto through the medium of the battery C and cause the tube 2' to operate at normal plate current and power. However, upon failure of signal grid input voltage, the rectified D. C. control potential will also fail and allow the negative C-bias supply C to take over and prevent overloading of the plate circuit of tube 2'.

DESCRIPTION AND OPERATION OF FIG. 3

Figure 3:
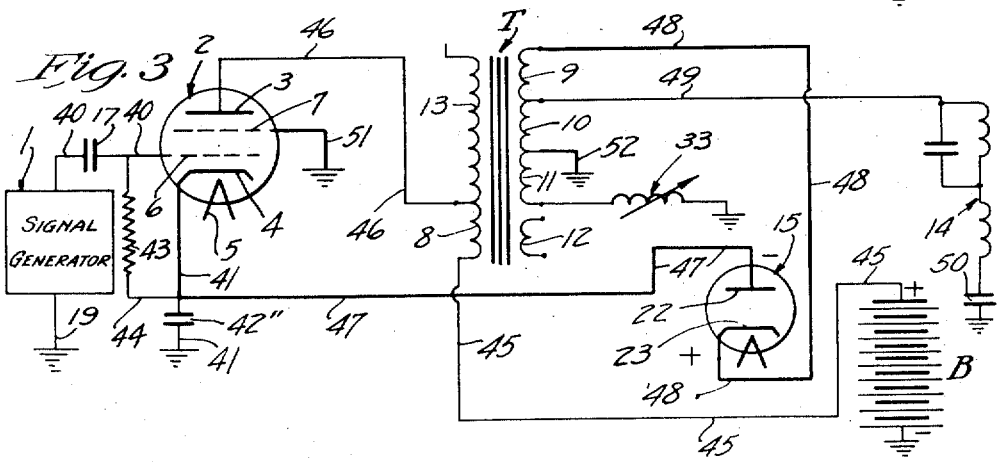
Fig. 3 is a schematic wiring diagram similar to Figs. 1 and 2 but illustrating a still further form or embodiment of the invention.

In Fig. 3, the signal generator 1 is identical to the signal generators of Figs. 1 and 2, the horizontal output tube 2 is identical to the tetrode output tube of Fig. 1, the transformer T is identical to transformers T of Figs. 1 and 2, the damper tube 15 is identical to the damper tubes 15 of Figs. 1 and 2, the battery B is identical to the batteries B of Figs. 1 and 2, the horizontal yoke coil 14 is identical to the horizontal yoke coils 14 of Figs. 1 and 2, and the picture width control 33 is identical to picture width controls 33 of Figs. 1 and 2. While the conventional elements of the system of Fig. 3 are like those of preceding figures, the electrical hookup of these conventional elements is, nevertheless, somewhat different. In Fig. 3, one side of the signal generator 1 is grounded by a lead 19, signal grid 6 of tube 2 is connected to the other side of the signal generator by a lead 40 and condenser 17, and the cathode 4 is connected to ground by a lead 41 and tank-acting condenser 42''. In the hook-up of Fig. [1] *3*, the signal grid 6 is connected to the cathode through a balancing resistor 43, a lead 44, and lead 41. The plate circuit of Fig. 3 comprises the high voltage source of potential B, a lead 45 from the positive side of source B, the primary winding 8 of transformer T, a lead 46, the plate 3 and cathode 4 of tube 2, lead 41, a lead 47, plate 23 and cathode 4 of damper tube 2, a lead 48, sections 9 and 10 of the multiple section secondary winding of transformer T and ground returning back to source B. The circuit for the yoke coil 14 of Fig. 3 is connected across the section 10 of the multiple section secondary winding of transformer T by a lead 49, ground and a condenser 50 interposed between one end of yoke coil 14 and ground.

The primary object of Fig. 3 is to show an adaptation of the invention wherein the conventional [rectifying] *rectifier* acting damper tube 15, which is common in the horizontal sweep sections of television instruments, is utilized as a source of D. C. power control potential for the horizontal output tube 2. This system, therefore, makes it unnecessary to provide for the purpose of power control an additional rectifier, such as shown at 36 in Fig. 1 and 36' in Fig. 2. In the arrangement of Fig. 3, it should be noted that the screen grid 7 of tube 2 is grounded at 51, whereas one end of transformer secondary section is grounded at 52. Of course, the transformer secondary sections 10 and 9 are serially connected in the plate circuit of tube 2 as a common secondary winding, having one end grounded at 52 and the other end connected to the positive side of the rectifier-acting damper tube 15. In this system, the damper tube is, however, connected in the cathode leg of the plate circuit of tube 2 with the cathode connected directly to the negative or plate side of the rectifier-acting damper tube 15. In the system of Fig. 3, there will obviously be no alternating current developed in the connected sections 9 and 10 of the secondary winding of transformer T in the absence of the signal voltage in the signal grid circuit of tube 2. Hence, under conditions of signal grid input voltage failure, the screen grid, being grounded, will be at ground potential and sufficiently negative with respect to cathode potential to prevent excessive plate current and power in the plate circuit of tube 2. However, when the system of Fig. 3 is operating normally with a predominately negative signal voltage applied to the signal grid 6, and which will tend to reduce the current and power in the plate circuit, there will also be an A. C. signal voltage developed across the connected secondary winding sections 9 and 10, which is rectified and present in the plate circuit as intermittent D. C. Since one end of the transformer secondary winding comprising sections 9 and 10 is connected to the positive side of the rectifier-acting damper tube 15 and the other end thereof is connected through ground to the screen grid 7 of tube 2, the positive component of this rectified D. C. signal voltage will be impressed upon the screen grid 7 of tube 2 through a safety power control circuit comprising leads 52 from one end of the transformer secondary winding section 10 to ground, a lead 51 from ground to screen grid 7, cathode 4 of tube 2, leads 41 and 47, the plate 23 and cathode 24 of the damper tube 15, and a lead 48 to transformer secondary section 9. In this safety power control circuit, the source of control potential for screen grid of tube 2 is, as in the circuits above described, completely dependent upon maintenance of signal input voltage to the grid 6 of tube 2. Of course, the value of D. C. control potential applied to the screen grid 7 will be adjusted to cause the tube 2 to operate at the desired normal plate circuit current and power in the presence of the predominately-negative signal grid input voltage and, while intermittent, will be in proper phase relationship to the signal grid voltage to accomplish the end mentioned.

While in the above specification I have described a preferred embodiment and two modifications which my invention may assume in practice, it will, of course, be understood that the same is capable of further modification and that modification may be made without departing from the spirit and scope of the invention as expressed in the following claims.

What I claim is:

1. In the horizontal sweep section of a television instrument, an output tube having a plate, a cathode, a signal grid, and a screen grid; a control grid driving circuit comprising the grid and cathode of said tube and wherein there is normally a substantially continuous signal potential of predominately negative factor; an output transformer having primary and secondary windings; a horizontal sweep yoke coil; a circuit comprising said yoke coil and a secondary winding of the transformer; a plate circuit comprising a D. C. source, a primary winding of the transformer, the plate and cathode of the output tube, a rectifier serving as a damper, and said secondary winding of the output transformer; and a safety power control circuit for the output tube comprising a secondary winding of the output transformer and a rectifier having its positive D. C. output side coupled to the screen grid of the output tube as a power control for the output tube, energization of the safety power control circuit being dependent upon the presence of the said predominately negative signal potential in the control grid circuit, the said rectifier applying a sufficiently high positive potential to the screen grid to increase the power output rate of the output tube beyond the normal operating range thereof in the absence of the said predominately negative control signal potential, and the predominately negative control grid signal potential serving to reduce the power output rate of the output tube to within its normal operating range, whereby loss of the predominately negative control grid signal potential will result in a simultaneous loss of screen grid potential and prevent serious overloading of the output tube and elements in circuit therewith.

2. In the horizontal sweep section of a television instrument, an output tube having a plate, a cathode, a signal grid, and a screen grid; a control grid driving circuit comprising the grid and cathode of said tube and wherein there is normally a substantially continuous signal potential of predominately negative factor; an output transformer having primary and secondary windings; a horizontal sweep yoke coil; a circuit comprising said yoke coil and a secondary winding of the transformer; a plate circuit comprising a D. C. source, a primary winding of the transformer, the plate and cathode of the output tube, a rectifier serving as a damper, and said secondary winding of the output transformer; and a safety power control circuit for the output tube comprising a secondary winding of the output transformer and the said rectifier, said rectifier having its positive D. C. output side coupled to the screen grid of the output tube as a power control for the output tube, energization of the safety power control circuit being dependent upon the presence of the said predominately negative signal potential in the control grid circuit, the said rectifier applying a sufficiently high positive potential to the screen grid to increase the power output rate of the output tube beyond the normal operating range thereof in the absence of the said predominately negative control signal potential, and the predominately negative control grid signal potential serving to reduce the power output rate of the output tube within its normal operating range, whereby loss of the predominately negative control grid signal potential will result in a simultaneous loss of screen grid potential and prevent serious overloading of the output tube and elements in circuit therewith.

[3. In a horizontal sweep section of a television instrument, a horizontal sweep power output tube having plate and cathode and grid elements, a driving circuit for said tube comprising grid and cathode elements of said tube and a substantially continuous and uniform source of signal voltage of predominatety negative factor; an output transformer having primary and secondary windings; a plate circuit for the output tube comprising a primary winding of the transformer and plate and cathode elements of the tube; a power output circuit comprising a secondary winding of the transformer and a horizontal yoke coil; and a safety power control circuit for said output tube comprising a secondary winding of the transformer, a rectifier, and an element of the tube other than the plate thereof and which responds to potential of proper polarity to cause an increase in plate current, the said safety power control circuit applying a D. C. potential to the said element of the tube which is of a polarity to increase the plate current flow in the tube, the predominately negative tube driving voltage being of sufficient value to reduce plate current flow in the tube below normal in the absence of the said control potential provided by the safety control circuit, the safety control circuit supplying a sufficient value of control potential to the said element of the tube to increase the plate current flow of the tube to a desired normal operating value in the presence of the predominately negative tube-driving signal voltage and to cause excessive plate current flow in the tube and overloading thereof in the absence of said predominately negative driving signal voltage, energization of the safety control circuit being dependent upon the presence of said predominately negative driving signal voltage and failing as a result of drive voltage failure to thereby prevent overloading of the tube and associated circuits and components as a result of drive voltage failure.]

4. In a horizontal sweep section of a television instrument, a horizontal sweep power output tube having a plate, a cathode, a signal grid, and a screen grid; a driving circuit for said tube comprising the signal grid and cathode of said tube and a substantially continuous and uniform source of signal voltage of predominately negative factor; an output transformer having primary and secondary windings; a plate circuit for the output tube comprising a primary winding of the transformer and the plate and cathode of said tube; a power output circuit comprising a secondary winding of the transformer and a horizontal yoke coil; and a safety power control circuit for said output tube comprising a secondary winding of the transformer, a rectifier having its positive D. C. output side coupled to the screen grid of the amplifier tube to provide a plate current increasing control potential to the said tube, the predominately negative signal voltage impressed upon the signal grid of the tube being of sufficient value to reduce the plate current flow in the tube to below normal in the absence of the control potential applied to the screen grid of the tube by the safety control circuit, the safety control circuit applying a sufficiently high value of control potential to the screen grid of the output tube to increase the plate current flow in the tube to a desired normal operating value in the presence of the predominately negative signal voltage at the signal grid and to cause excessive plate current flow in the tube and overloading thereof in the absence of said predominately negative signal voltage, energization of the safety control circuit being the result of and dependent upon the presence of said predominately negative signal grid driving voltage and failing as a result of driving voltage failure to thereby prevent overloading of the tube and associated circuits and components as a result of drive voltage failure.

References Cited in the file of this patent or the original patent

UNITED STATES PATENTS

| Number | Name | Date |
|---|---|---|
| 2,185,612 | Trevor | Jan. 2, 1940 |
| 2,247,203 | Roberts | June 24, 1941 |
| 2,318,061 | Dailey | May 4, 1943 |
| 2,414,546 | Nagel | Jan. 21, 1947 |
| 2,466,784 | Schade | Apr. 12, 1949 |
| 2,474,474 | Friend | June 28, 1949 |
| 2,476,854 | Friend | July 19, 1949 |
| 2,478,744 | Clark | Aug. 9, 1949 |
| 2,492,090 | Bass | Dec. 20, 1949 |
| 2,510,027 | Torsch | May 30, 1950 |
| 2,521,158 | Gannaway | Sept. 5, 1950 |
| 2,543,305 | Schwarz | Feb. 27, 1951 |
| 2,545,346 | Edelsohn | Mar. 13, 1951 |
| 2,553,360 | Court | May 15, 1951 |